US010060080B2

(12) United States Patent
Kriech et al.

(10) Patent No.: US 10,060,080 B2
(45) Date of Patent: *Aug. 28, 2018

(54) VOID REDUCING ASPHALT MEMBRANE COMPOSITION, METHOD AND APPARATUS FOR ASPHALT PAVING APPLICATIONS

(71) Applicant: Heritage Research Group, Indianapolis, IN (US)

(72) Inventors: Anthony J. Kriech, Indianapolis, IN (US); Herbert L. Wissel, Indianapolis, IN (US); Timothy P. Reece, Indianapolis, IN (US); Marvin Keller Exline, Terre Haute, IN (US)

(73) Assignee: Heritage Research Group, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/646,912

(22) Filed: Jul. 11, 2017

(65) Prior Publication Data

US 2017/0306569 A1 Oct. 26, 2017

Related U.S. Application Data

(63) Continuation of application No. 15/064,819, filed on Mar. 9, 2016, now Pat. No. 9,732,478.

(60) Provisional application No. 62/302,335, filed on Mar. 2, 2016, provisional application No. 62/130,293, filed on Mar. 9, 2015.

(51) Int. Cl.

| | |
|---|---|
| E01C 11/00 | (2006.01) |
| E01C 11/02 | (2006.01) |
| E01C 11/24 | (2006.01) |
| C08K 3/00 | (2018.01) |
| E01C 7/32 | (2006.01) |
| E01C 7/30 | (2006.01) |
| C08K 3/36 | (2006.01) |
| C08K 5/09 | (2006.01) |
| C08L 93/00 | (2006.01) |
| E01C 7/18 | (2006.01) |
| C08L 95/00 | (2006.01) |
| C08L 91/06 | (2006.01) |
| C08L 101/12 | (2006.01) |
| C08K 3/013 | (2018.01) |
| C08K 3/22 | (2006.01) |

(52) U.S. Cl.
CPC ............ *E01C 11/02* (2013.01); *C08K 3/0033* (2013.01); *C08K 3/013* (2018.01); *C08K 3/36* (2013.01); *C08K 5/09* (2013.01); *C08L 91/06* (2013.01); *C08L 93/00* (2013.01); *C08L 95/00* (2013.01); *C08L 101/12* (2013.01); *E01C 7/18* (2013.01); *E01C 7/30* (2013.01); *E01C 7/32* (2013.01); *E01C 7/325* (2013.01); *E01C 11/24* (2013.01); *C08K 2003/2227* (2013.01); *C08L 2555/50* (2013.01); *C08L 2555/60* (2013.01); *C08L 2555/80* (2013.01); *C08L 2555/84* (2013.01)

(58) Field of Classification Search
CPC . E01C 7/18; E01C 7/325; E01C 11/02; E01C 11/24; E01C 7/30; E01C 7/32; C08L 95/00; C08L 2555/84; C08L 2555/60; C08L 2555/50; C08L 2555/80; C08L 93/00; C08L 91/06; C08L 101/12
USPC .................. 404/17, 31, 72, 75, 107, 111
See application file for complete search history.

(56) References Cited

U.S. PATENT DOCUMENTS

| | | | |
|---|---|---|---|
| 2,330,568 A | 5/1941 | Erickson | |
| 2,821,890 A | 7/1958 | Wilson | |
| 3,870,426 A * | 3/1975 | Kietzman | E01C 7/262 |
| | | | 106/282 |
| 4,511,283 A | 4/1985 | Duval et al. | |
| 4,511,284 A | 4/1985 | Sterner | |
| 4,592,507 A | 6/1986 | Benedict | |
| 4,630,965 A | 12/1986 | Nguyen et al. | |
| 4,678,363 A | 7/1987 | Sterner | |
| 4,682,909 A | 7/1987 | Mihara | |
| 5,026,609 A | 6/1991 | Jacob | |
| 5,131,788 A | 7/1992 | Hulicsko | |
| 5,232,306 A | 8/1993 | Sterner | |

(Continued)

FOREIGN PATENT DOCUMENTS

| | | |
|---|---|---|
| CN | 1834160 A | 9/2006 |
| DE | 1 534 429 A1 | 9/1969 |

(Continued)

OTHER PUBLICATIONS

Anonymous: "Polyguard Pavement Underseal and Waterproofing Membranes", XP-055289880, Ennis, TX 75120-0755, , dated May 23, 2016, Retrieved from Internet: URL:http://www.polyguardproducts.com/products/highway/datasheets/665_NW-75.pds [retrieved on Jul. 20, 2016] (pp. 1-4).

(Continued)

Primary Examiner — Raymond W Addie
(74) Attorney, Agent, or Firm — Brinks Gilson & Lione

(57) ABSTRACT

A void reducing asphalt membrane composition for asphalt pavements that includes: an asphalt binder; an elastomeric polymer; a wax modifier; and at least one of: i) fumed silica or fumed alumina; and ii) a saponified fatty acid and a resin acid gelling compound. The composition is resistant to flow when applied and migrates into hot mix asphalt in the area of the longitudinal joint to reduce air voids to 7% or less and reduce water permeability. The composition becomes tack-free quickly after application. The composition bonds to asphalt, concrete, brick, stone and metal.

14 Claims, No Drawings

(56) References Cited

U.S. PATENT DOCUMENTS

| | | |
|---|---|---|
| 5,333,969 A | 8/1994 | Blaha et al. |
| 5,419,654 A | 5/1995 | Kleiger |
| 5,439,313 A | 8/1995 | Blaha et al. |
| 5,773,496 A * | 6/1998 | Grubba .................. C08K 3/06 524/68 |
| 5,795,929 A * | 8/1998 | Grubba .................. C08L 95/00 524/59 |
| 5,895,173 A | 4/1999 | O'Brien et al. |
| 5,957,621 A | 9/1999 | Clark, Jr. et al. |
| 5,981,061 A | 11/1999 | Hegemann |
| 6,079,901 A | 6/2000 | Banks et al. |
| 6,089,785 A | 7/2000 | Bergman |
| 6,113,309 A | 9/2000 | Hollon |
| 6,382,523 B1 | 5/2002 | Hedegard |
| 6,776,557 B2 | 8/2004 | Barnat et al. |
| 6,802,464 B2 | 10/2004 | Marconnet |
| 6,805,516 B2 | 10/2004 | Barnat et al. |
| 6,918,714 B2 | 7/2005 | Chambard |
| 7,448,825 B2 | 11/2008 | Kasahara et al. |
| 7,448,826 B2 | 11/2008 | Laury |
| 7,488,138 B2 | 2/2009 | Buschmann |
| 7,503,724 B2 | 3/2009 | Blacklidge |
| 7,572,081 B2 | 8/2009 | Buschmann |
| 7,798,744 B2 | 9/2010 | Larson et al. |
| 7,927,038 B2 | 4/2011 | Dawson |
| 8,439,597 B2 | 5/2013 | Diamond |
| 8,465,224 B2 | 6/2013 | Price et al. |
| 8,702,342 B2 | 4/2014 | Price et al. |
| 8,740,498 B2 | 6/2014 | Velicky |
| 9,435,084 B2 | 9/2016 | Bartoszek |
| 2011/0313088 A1 | 12/2011 | Binkley |
| 2014/0112717 A1 | 4/2014 | Yu |
| 2014/0219722 A1 | 8/2014 | Velicky |
| 2016/0130474 A1 | 5/2016 | Dongre |
| 2016/0208098 A1 * | 7/2016 | Naidoo .................. C08L 95/00 |
| 2016/0265169 A1 | 9/2016 | Kriech et al. |
| 2016/0355999 A1 | 12/2016 | Bartoszek |
| 2017/0356136 A1 * | 12/2017 | Kriech .................. E01C 7/325 |

FOREIGN PATENT DOCUMENTS

| | | |
|---|---|---|
| FR | 818 518 A | 9/1937 |
| FR | 843 987 A | 7/1939 |
| GB | 2 420 144 A | 5/2006 |

OTHER PUBLICATIONS

Anonymous: "Rehabilitation of Concrete Pavements with Polyguard NW-75 Prior to Asphalt Overlay", XP055289887, Retrieved from Internet: URL:http://www.polyguardproducts.com/products/highway/concreterehab.htm [retrieved on Jul. 20, 2016], May 23, 2016 (pp. 1-3).

European extended Search Report from corresponding European application No. 16159379.3 dated Aug. 2, 2016 (14 pgs).

Hailesilassie Biruk W. et al., "Testing of blister propagation and peeling of orthotropic bituminous waterproofing membranes", *Materials and Structures*, London, GB, vol. 48, No. 4, Nov. 21, 20163 (pp. 1095-1108).

Iowa DOT: Jeff DeVries & Mark Doug, "Iowa DOT Hardin County SR 57", Prime Contractor: Mannatt's Inc., Applicator: Road Fabrics Inc., Iowa DOT Report dated Oct. 19, 2016 (6 pgs).

McDonald, Rebecca S., "Longitudinal Joint Specifications and Performance", Publication FHWA/IN/JTRP-20912-29, Joint Transportation Research Program, Indiana Department of Transportation and Purdue University, W. Lafayette, IN, 2012, doi: 10.5703/1288284315024, (2 pgs) view full text at http://dx.doi.org/10.5703/1288284315024.

Sorensen E.V., "Protecting Bridge Reinforcement", *Concrete Engineering International, Concrete Society*, Camberley, GB, vol. 6, No. 3, Sep. 1, 2002 (p. 58).

* cited by examiner

VOID REDUCING ASPHALT MEMBRANE COMPOSITION, METHOD AND APPARATUS FOR ASPHALT PAVING APPLICATIONS

RELATED APPLICATIONS

The present application is a continuation application of U.S. Non-Provisional application Ser. No. 15/064,819, filed Mar. 9, 2016, now U.S. Pat. No. 9,732,478, which in turn is based upon U.S. Provisional Application Ser. No. 62/130, 293, filed Mar. 9, 2015 and 62/302,335 filed Mar. 2, 2016 to all of which priority is claimed under 35 U.S.C. § 120 and of all of which the entire disclosures are hereby expressly incorporated by reference.

TECHNICAL FIELD

The present invention relates to installation and preventive maintenance of asphalt paved surfaces. More particularly the present invention relates to void reducing asphalt membrane compositions and methods for bonding and reducing voids in longitudinal asphalt pavement construction joints in a variety of paved surface construction joint applications and equipment/apparatus for applying a void reducing asphalt membrane beneath or on the vertical face of longitudinal asphalt pavement construction joints.

BACKGROUND ART

The cracking of longitudinal asphalt pavement construction joints is a common pavement distress associated with asphalt pavements. When an asphalt pavement is constructed the width of the pavement is limited by the width of the screed or screed extensions. This width can vary from 8 feet to a maximum of about 35 feet in special cases. Pavement widths that are greater than the maximum screed width require the formation of a longitudinal asphalt pavement construction joint where the hot mix asphalt is paved against the edge of previously laid portion of the pavement. In many situations, the reconstruction of roadways may not allow for full closure to traffic. In such situations which are typical, paving width is limited to one lane (normally 12 feet or 3.6 meters wide) while vehicular traffic is redirected onto an adjacent pavement. This limitation forces the next lane to be placed against the first pavement forming a longitudinal asphalt pavement construction joint between the lanes.

There are a number of deficiencies that are associated with longitudinal asphalt pavement construction joints. For example, the unconfined edges of a first pass of the pavement cannot be compacted to the same degree that the center of the first pass is compacted. Compaction increases density and reduces air voids which are critical to the performance of asphalt pavements. After the first pass is completed an adjacent pass places a hot paving mixture against the now cold first paving pass, creating a longitudinal asphalt pavement construction joint between the two paving passes or lanes.

As a result, the area along the longitudinal asphalt pavement construction joint is higher in air voids, creating permeability to air and water causing the joint to be subject to oxidization and aging more rapidly than the rest of the pavement. The area along the longitudinal asphalt pavement construction joint can be a foot in width where the air voids are higher than the area in the middle of the paving lane. In areas where freeze/thaw occurs, water can intrude into the permeable joint and adjacent area and freeze. As these events occur, the joint becomes significantly weaker than the rest of the pavement, resulting in a greater tendency for the joint to crack from heating and cooling (expansion and contraction) of the adjacent pavement.

Once cracks form along longitudinal asphalt pavement construction joints they allow more water and air to penetrate into the underlying layers of the pavement, causing more damage to the joint and underlying pavement layers. This accelerates the development of fatigue cracks radiating outward from longitudinal cracks which often widens the longitudinal cracks and accelerates the overall damage to the pavement structure.

The initiation of longitudinal asphalt pavement construction joint cracks is caused by the shrinkage of asphalt surface due to pavement heating and cooling cycles from day to night and summer to winter. The cracking occurs at the longitudinal asphalt pavement construction joint because the density of the joint is lower than the rest of the pavement causing a weak bond to be formed. The joint has the lowest tensile strength in the pavement and fails first when the pavement contracts as it cools. A second factor in longitudinal asphalt pavement construction joint cracking is oxidative hardening of the asphalt due to high air voids in the mixture in the joint area which makes that material particularly susceptible to cracking and subsequent raveling. The asphalt mixture adjacent to the longitudinal asphalt pavement construction joint cracking is exposed to air and water intrusion which can lead to poor adhesion between the asphalt and aggregate, which further causes more rapid deterioration (raveling). During early stages, these cracks are usually repaired by sealing. After raveling begins to develop, the repair is more extensive, since the materials adjacent to the crack must be removed and replaced. These maintenance activities are labor intensive and create safety concerns for the maintenance crews since they are usually performed when the pavement is under traffic conditions. This also causes traffic delays for the motoring public.

Longitudinal asphalt pavement construction joint cracking and subsequent raveling degrade pavement serviceability, shorten pavement life and increase life cycle cost. Therefore the reduction or elimination of longitudinal asphalt pavement construction joint cracking results in reduced life cycle costs and increased pavement life.

There are two primary approaches that have been traditionally used to delay longitudinal asphalt pavement construction joint cracking problems. One approach is to make the joint stronger than the adjoining material so that the pavement will not fail at the joint under temperature expansion/contraction. Joint compaction techniques are attempts to prevent cracking in this manner. The second approach to crack prevention is to put very elastic pliable material into the joint during the pavement construction. When this method is used, as the pavement contracts, the joint material simply flows to release the stress.

Mechanical devices have been developed which are intended to compact the unconfined edge of pavement or cut the high air void edge from the pavement. In practice, this approach has not solved the problem of creating a strong joint which lasts as long as the pavement.

Other approaches involve providing an elastic pliable material in the form of a tape at the pavement joint. This tape is placed against a cold longitudinal asphalt pavement construction joint of the pavement. Before use, the joint is cleaned so as to be free of dirt and unbonded material. The edge of the joint tape is then applied to be flush with the surface of the pavement. Next, the non-stick release paper is removed and the placement of the adjacent pavement section is completed. Once the hot mix asphalt is placed against the tape, the tape melts, binding the joint together.

Comparison between pavements installed with joint tape and those installed without a joint tape indicate that the joint tape provides a joint that lasts longer before cracking. The air void content at the immediate area of the joint are reduced and therefore, the joints are less permeable to water. While the joint tape can help address the bond between the adjacent pavement layer and reduce the air voids at the immediate joint face, it fails to address the higher air voids up to a foot away from the joint. Another deficiency of joint tape is the high labor to physically prepare/clean the area and install the material Studies conducted on highways on a life cycle basis find that pavements in the northern part of the United States develop longitudinal asphalt pavement construction joint cracking within 2 to 3 years after placement of hot mix asphalt. The current treatment strategy is to crack fill the joint with a standard polymerized asphalt or crumb rubber asphalt. The problem is that this topical treatment does not treat the damage caused by water which reaches further into the pavement prior to treatment. Highway departments find that current treatment protocols only last 3 to 4 years after which the crack fill is repeated. Ordinarily pavements currently last 13 years on average. This relatively short 13 year life often is due to damage near the longitudinal asphalt pavement construction joint.

The present invention provides void reducing asphalt membrane compositions and placement that overcome many of the disadvantages associated with known joint materials and installation techniques.

DISCLOSURE OF THE INVENTION

According to various features, characteristics and embodiments of the present invention which will become apparent as the description thereof proceeds, the present invention provides for void reducing asphalt membrane compositions that can be placed in a band on an existing pavement surface that defines the first substrate in the area where the new longitudinal joint(s) will be constructed. The band of void reducing asphalt membrane is wide enough to be beneath the area of the new pavement lift that is typically low in density, high in air void volume. The band of void reducing asphalt membrane is in sufficient thickness to allow migration into the new asphalt mixture lift overlay and reduce the air void volume and ability for water to infiltrate and damage the new asphalt mixture overlay and underlying structure. The band of void reducing asphalt membrane can be driven over by the construction equipment or the traveling public and not be displaced or picked up on tires/tracks and removed from its intended location. The band of void reducing asphalt membrane will not flow laterally from its intended placement location. The void reducing asphalt membrane will adhere to the existing pavement surface, whether it is asphalt concrete, Portland cement concrete, milled asphalt concrete or Portland cement concrete, brick or chip seal surface, etc. The void reducing asphalt membrane composition generally comprises a mixture of asphaltic binder, elastomeric polymers, thickener and additive to reduce tackiness.

According to one embodiment the present invention provides a void reducing asphalt membrane composition that comprises:
an asphalt binder;
an elastomeric polymer; and
a wax modifier,
and can further comprise at least one of:
i) fumed silica or fumed alumina; and
ii) a saponified fatty acid and a resin acid gelling compound.

The present invention further provides an asphalt pavement void reducing asphalt membrane composition that comprises:
an asphalt binder;
an elastomeric polymer;
a wax modifier; and
at least one of:
i) fumed silica or fumed alumina; and
ii) a saponified fatty acid and a resin acid gelling compound.

The present invention also provides a method of forming a longitudinal asphalt pavement construction joint which comprises:
applying a band of void reducing asphalt membrane underneath a lift of asphalt mixture pavement where the longitudinal pavement joint(s) are forecasted to be constructed. The void reducing asphalt membrane may also be applied on the vertical face of newly constructed asphalt mixture longitudinal pavement joint upon completion of its construction; said void reducing asphalt membrane comprising:
an asphalt binder;
an elastomeric polymer; and
a wax modifier; and
providing a hot mix above band of the void reducing asphalt membrane composition.

BEST MODE FOR CARRYING OUT THE INVENTION

The present invention is directed to a new preventative maintenance product and process for pavement construction involving hot mix asphalt and particularly to the construction of joints between adjacent pavements and non-asphaltic surfaces such as concrete.

The present invention provides void reducing asphalt membrane compositions which, when used in pavement applications, are placed below the new lift of asphalt mixture pavement and/or against a cold joint on the vertical face of a newly created lift of asphalt mixture pavement before an adjacent hot mix is put down against or over the cold joint to form a good bond between the cold joint and hot mix and reduce air voids and water permeability and create better crack resistance in the area of the joint. The void reducing asphalt membrane compositions of the present invention have been formulated so as to be resistant to lateral flow prior to paving over with hot mix asphalt in order to remain in the joint area in sufficient quantity to fill voids. At the same time the void reducing asphalt membrane composition is formulated so that it can be applied in a sufficient thickness to allow it to migrate upward into a freshly placed asphalt overlay during a paving process to reduce air voids and reduce water permeability. In multi-pass pavement applications the void reducing asphalt membrane composition can be provided between adjacent passes of asphalt, including on the vertical face or edge of a first or previous pass. Further a conventional tack coating can be provided under a first or previous pass alone or together with a band of the void reducing asphalt membrane composition.

The void reducing asphalt membrane composition is sufficiently non-tracking or loses its tackiness quickly so as to allow for construction traffic to drive over the applied composition during placement of an asphalt overlay or an adjacent pass and avoid work stoppage during a paving operation. Generally after application the void reducing asphalt membrane composition may be driven across by construction traffic or other vehicular traffic within 30 minutes of placement or as within as little as 15 minutes or less of placement. This ability to be non-tracking or quickly lose any tackiness solves constructability issues that plague other approaches to pavement joint construction.

The composition includes polymerized asphalt which allows a joint formed therefrom to expand and contract elastically, thus dissipating expansion and contraction forces. The highly compliant material behaves like an expansion joint in pavement applications which prevents stresses from building up at the joint which would otherwise tend to cause cracks to form and subsequent pavement failure.

The void reducing asphalt membrane composition of the present invention generally comprises a mixture of an asphalt binder, elastomeric polymers, a thickener and a wax modifier. Other embodiments comprise an asphalt binder, elastomeric polymers, a thickener, a wax modifier and fumed silica and/or fumed alumina. Further embodiments include an asphalt binder, elastomeric polymers, a thickener, a wax modifier and a saponified fatty acid and a resin acid gelling compound. Still further embodiments comprise an asphalt binder, elastomeric polymers, a thickener, a wax modifier fumed silica and/or fumed alumina and a saponified fatty acid and a resin acid gelling compound.

The asphalt binder is the main component of the composition and provides the material strength or foundation to fill voids in the area of the longitudinal asphalt pavement construction joint. The asphalt binder can comprise 85 to 97 wt. % of the composition and more preferably 90 to 93 wt. % of the composition. Suitable asphalt binders include paving grade asphalts including; performance graded, viscosity graded or/and penetration graded.

The composition includes an elastomeric polymer component that allows the area in and around the longitudinal asphalt pavement construction joint formed therefrom to expand and contract elastically. The polymer component creates a polymer modified asphalt binder in combination with the asphalt binder component. Suitable examples of this polymer component include Styrene-Butadene-Styrene (SBS), Styrene-Butadene Rubber (SBR), Ethylene-Styrene-Interpolymers (ESI), Evaloy (an ethylene terpolymer available from Dupont), and other elastomeric polymers that are used in polymer modified asphalt compositions. This polymer component can comprise 1 to 6 wt. % of the composition and more preferably 2 to 5 wt. % of the composition.

The wax modifier reduces the viscosity of the composition at the paving temperature so that during a paving process the composition can migrate upward into a freshly placed asphalt overlay to reduce air voids and reduce water permeability. Furthermore, at pavement surface temperature, the wax modifier provides stiffness to the void reducing asphalt membrane which reduces issues with tracking. Suitable wax modifiers include, but are not limited to, waxes of vegetable (e.g. carnuba wax), animal (e.g. beeswax) mineral (e.g. Montan™ wax from coal, Fischer Tropsch wax from coal) or petroleum (e.g. paraffin wax, polyethylene wax, Fischer-Tropsch wax from gas) origin including oxidised waxes; amide waxes (e.g. ethylene bis stearamide, stearyl amide, stearoylstearamide); fatty acids and soaps of waxy nature (e.g. aluminum stearate, calcium stearate, fatty acids). The wax modifier also improves cohesion properties of the composition. The wax modifier can comprise 1 to 5 wt. % of the composition and more preferably 2 to 4 wt. % of the composition.

The fumed silica and/or fumed alumina function as fillers and impart resistance to flow immediately after application and give a non-tacky character to the composition that prevents pick-up by construction and non-construction equipment before paving is complete.

The fumed silica and fumed alumina can be used alone or together in any desired proportion. The total amount of fumed silica and/or fumed alumina can comprise 1 to 10 wt. % of the composition and more preferably 3 to 6 wt. % of the composition.

The saponified fatty acid and resin acid gelling compound functions to control the rate at which the composition sets or cures. Suitable saponified fatty and resin acid gelling compounds include but are not limited to crude tall or distilled tall oil. The total amount of saponified fatty acid and resin acid gelling compound can comprise 0 to 3 wt. % of the composition and more preferably 1 to 2 wt. % of the composition.

A typical formulation of the void reducing asphalt membrane composition is made by adding the polymer component to the heated asphalt binder while shearing the mixture. After or before the polymer component and asphalt binder are thoroughly mixed the wax modifier can be added while shearing the mixture followed by the addition of the fumed silica and/or fumed alumina are and saponified fatty acid and resin acid gelling compound. The mixed void reducing asphalt membrane should be stored under conditions of agitation and heating until application.

During the course of the present invention the inventors discovered that when the final polymer composition included fumed silica and/or fumed alumina the resulting polymer composition demonstrated improved heat stability. Furthermore the polymer properties imparted to the composition remained more consistent over time while at an elevated temperature as compared to a similar composition that did not include fumed silica and/or fumed alumina.

In a typical application the void reducing asphalt membrane composition of the present invention is placed in a band from 4 to 24 inches wide on the surface to be paved (also referred to as a cold joint portion) in the area where a longitudinal construction joint of an asphalt overlay or pass will develop. Subsequently the asphalt overlay or pass is laid down. In the case of multi-pass pavement installations before an adjacent paving pass is placed, a band of the void reducing asphalt membrane composition having a width of 4 to 24 inches is applied over and against the vertical face portion of a previously laid pavement pass in the area where the longitudinal joint will occur under the adjacent paving pass. The thickness of applied band of void reducing asphalt membrane compound in any situation can be $\frac{1}{16}$ to $\frac{3}{8}$ of an inch depending on the overlay type and thickness. These widths and thickness ranges are exemplary of typical applications; however, it is to be understood that other widths and thicknesses and combinations thereof could be used. The thickness of the applied band can be adjusted to allow migration of a volume of the void reducing asphalt membrane composition into the asphalt overlay and reduce the air void volume and ability for water to infiltrate and damage the overlay and underlying structure. The band of void reducing asphalt membrane composition can be applied to any existing surface to be paved including asphalt concrete, Portland cement concrete, milled asphalt concrete or milled Portland cement concrete, brick or a chip seal surface as well as metal structures.

For paving of adjacent lanes the void reducing asphalt membrane composition can be applied to the vertical face of the first paving pass as well as on an area where the second application of the product as described above will be placed.

The air void volume in the finished asphalt overlay in the area of the longitudinal asphalt pavement construction joint above the void reducing asphalt membrane composition can be reduced to about 7% or lower due to the migration of the product into the finished asphalt overlay. In preferred embodiments the air void volume of the finished asphalt overlay will be reduced to 4% in the finished asphalt overlay in the area above the void reducing asphalt membrane composition.

In the area of the longitudinal asphalt pavement construction joint the asphalt overlay mixture will be of low permeability to water infiltration as a result of the void reducing asphalt membrane composition migration into the asphalt overlay. The area of the longitudinal asphalt pavement construction joint over the void reducing asphalt membrane composition will be resistant to crack initiation and propagation.

The void reducing asphalt membrane composition can be applied using various coating methods such as coating, rolling, spraying, etc. According to one embodiment of the present invention the void reducing asphalt membrane composition can be applied using a strike off box that may be mounted on mobile equipment that can be pulled or pushed either manually or mechanically driven. Strike off boxes that are designed for use in narrow width paving projects are exemplified by U.S. Pat. No. 8,506,204 to Reames et al. incorporated herein by reference. Alternatively conventional paving equipment downsized to apply the void reducing asphalt membrane composition in desired widths can be used.

In other embodiments a spraying system can be used which can be mounted on mobile equipment that can be pulled or pushed either manually or mechanically driven. Otherwise the spraying can be achieved using a handheld spraying device such as a wand.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and encompassed by the attached claims.

What is claimed is:

1. A method of reducing air voids in a discrete portion of an asphalt pavement which comprises:
   providing an asphalt membrane composition that comprises:
     an asphalt binder,
     an elastomeric polymer,
     a wax modifier, and
     at least one of fumed silica or fumed alumina;
   applying a discrete band of the asphalt membrane composition on a surface to be paved with a hot mix asphalt;
   paving over the surface and discrete band of asphalt membrane composition with a hot mix asphalt to form a pavement; and
   allowing the asphalt membrane composition to migrate into the hot mix asphalt and reduce air voids in the pavement by migrating into the hot mix asphalt.

2. A method of reducing air voids in a discrete portion of an asphalt pavement according to claim 1, wherein the asphalt binder comprises 85 to 97 wt. % of the asphalt membrane composition.

3. A method of reducing air voids in a discrete portion of an asphalt pavement according to claim 1, wherein the surface to be paved comprises at least one of asphalt, concrete, brick, stone or metal.

4. A method of reducing air voids in a discrete portion of an asphalt pavement according to claim 1, wherein discrete band of asphalt membrane composition is positioned beneath a joint formed in the pavement.

5. A method of reducing air voids in a discrete portion of an asphalt pavement according to claim 4, wherein the pavement extends in a longitudinal direction and the joint formed in the pavement extends in the longitudinal direction.

6. A method of reducing air voids in a discrete portion of an asphalt pavement according to claim 4 wherein the joint is formed between two adjacent hot mix asphalt passes.

7. A method of reducing air voids in a discrete portion of an asphalt pavement according to claim 6, wherein the pavement extends in a longitudinal direction and the joint formed in the pavement extends in the longitudinal direction.

8. A method of reducing air voids in a discrete portion of an asphalt pavement according to claim 1, wherein the air voids are reduced to 7% or lower.

9. A method of reducing air voids in a discrete portion of an asphalt pavement according to claim 1, wherein the asphalt membrane composition further comprises at least one of a saponified fatty acid and a resin acid gelling compound.

10. A method of reducing air voids in a discrete portion of an asphalt pavement according to claim 1, wherein the discrete band of the asphalt membrane composition has a thickness that ranges from 1/16 to 3/8 inches.

11. A method of reducing air voids in a discrete portion of an asphalt pavement according to claim 1, wherein asphalt membrane composition is formulated to include 85 to 97 wt. % of the asphalt binder, 1 to 6 wt. % of the elastomeric polymer and 1 to 5 wt. % of the wax modifier.

12. A method of reducing air voids in a discrete portion of an asphalt pavement according to claim 1, wherein the total amount of fumed silica and fumed alumina in the asphalt membrane composition is 1 to 10 wt. %.

13. A method of reducing air voids in a discrete portion of an asphalt pavement according to claim 9, wherein the total amount of the saponified fatty acid and the resin acid gelling compound in the asphalt membrane composition is up to 3 wt. %.

14. A method of reducing air voids in a discrete portion of an asphalt pavement according to claim 1, wherein the asphalt membrane composition is applied to the surface to be paved by coating, rolling, spraying or a combination thereof.

* * * * *